United States Patent [19]
Judd et al.

[11] 4,169,163
[45] Sep. 25, 1979

[54] PROCESS FOR REDUCING THE COEFFICIENT OF FRICTION IN REGENERATED CELLULOSE SAUSAGE CASINGS

[75] Inventors: Henry E. Judd; Robert D. Talty, both of Danville, Ill.

[73] Assignee: Teepak, Inc., Chicago, Ill.

[21] Appl. No.: 681,625

[22] Filed: Apr. 29, 1976

[51] Int. Cl.² ............. A22C 11/00; A22C 13/00; B65D 81/34

[52] U.S. Cl. .................. 426/413; 138/118.1; 138/145; 426/90; 426/92; 426/105; 426/135; 426/415; 426/420; 426/811; 427/394

[58] Field of Search ............ 426/90, 92, 302, 645, 426/647, 105, 129, 652, 513, 135, 138, 140, 278, 282, 284, 641, 646, 414, 415, 514, 516, 811, 413, 420; 206/525, 802; 427/394; 428/35, 527, 411, 499, 508, 509, 510, 527; 138/118.1, 145

[56] References Cited

U.S. PATENT DOCUMENTS

| | | | |
|---|---|---|---|
| 2,063,279 | 12/1936 | Walter | 426/140 X |
| 2,210,436 | 8/1940 | Weingand et al. | 426/135 |
| 3,898,348 | 8/1975 | Chiu et al. | 426/135 X |
| 3,917,855 | 11/1975 | Burke | 426/278 X |
| 3,935,320 | 1/1976 | Chiu et al. | 426/135 X |

*Primary Examiner*—Arthur L. Corbin
*Attorney, Agent, or Firm*—Paul Shapiro; Joseph E. Kerwin; William A. Dittmann

[57] ABSTRACT

To reduce the number of oversize sausage links created during linking of stuffed regenerated cellulosic casings, the casing, before stuffing, has applied to the external walls thereof an aqueous dispersion containing a material which imparts a low coefficient of friction to the casing.

2 Claims, No Drawings

PROCESS FOR REDUCING THE COEFFICIENT OF FRICTION IN REGENERATED CELLULOSE SAUSAGE CASINGS

BACKGROUND OF THE INVENTION

1. Field of the Invention

This invention relates to the stuffing of cellulosic food casings with meat emulsions and more particularly to the treatment of the casing to insure the circumferential uniformity of the stuffed and linked casing.

2. The Prior Art

In the preparation of sausages of various types, ranging from small sausages such as frankfurters and viennas up to large sausages such as bolognas, the sausage meat is normally extruded into and encased in a tubular casing formed of regenerated cellulose. Clear, thin-walled (e.g., 1.0 to 1.5 mils) cellulosic casings are used primarily in the preparation of small diameter (22 to 23 mm) sausages such as frankfurters and viennas. Intermediate diameter (e.g., 56 to 58 mm) sausages referred to in the art as "chubs" and large diameter (e.g. 121 to 125 mm) sausages of the bologna type are encased in heavy walled (2.5 to 3.5 mils) cellulosic casings of both the clear and fibrous-reinforced type. In the manufacture of small sausages, the casing is generally stripped from the sausage after it has been smoked and cooked by the meat packer. In the manufacture of intermediate and large sausages, the sausage generally remains encased in the cellulosic casing after the sausage is cooked and smoked by the meat packer.

Regenerated cellulose sausage casings are typically made by the viscose process wherein a cellulosic furnish is treated with caustic soda to form an alkali crumb, the crumb shredded, xanthated and dissolved in caustic soda to form viscose.

The viscose is extruded through an annular die into a coagulating bath to produce a hollow, thin-walled tube of coagulated and partially regenerated cellulose. The tube is subsequently treated in an acid bath to thoroughly regenerate the cellulose and washed to remove by-products. The regenerated cellulose tube is treated with an aqueous solution of glycerine, and dried while inflated under a substantial air pressure for size control. After drying, the casing is wound on reels and subsequently shirred on high speed shirring machines, such as those described in U.S. Pat. Nos. 2,010,626, 2,583,654, 2,722,714, 2,722,715, 2,723,201, etc.

A type of casing known in the art as fibrous casing is manufactured by forming a long fiber hemp paper into a continuous tube, impregnating the tube with viscose, and treating the impregnated tube with a coagulating and regenerating bath to produce a paper reinforced tube of regenerated cellulose. Miscellaneous casing is manufactured in a similar manner to fibrous casing except no paper is used.

In the preparation of small and intermediate size sausages, a sausage paste or emulsion is extruded from a stuffing horn into a shirred sausage casing. In the manufacture of "chubs" which generally weigh less than a pound, the casing is supplied to the meat packer in the form of transparent, printed cellulosic casing having a length in the order of 55 to 66 feet which is compacted to a shirred length of 12 inches. Usually about 100 chubs can be manufactured from a single shirred strand.

To fill the shirred strand with the sausage paste, the strand which is pinched off at one end, is soaked in water to soften the strand and the other end of the moistened strand is mounted over the discharge end of a stuffing horn. The sausage paste is extruded into the casing at a high speed with the result that the entire length of the casing deshirrs and is filled with sausage paste in a few seconds. As the casing is filled with sausage emulsion, it passes into a linking device which twists the casing at predetermined intervals along the filled casing to form a plurality of individual sausage links. The linked strand is fed to a stainless steel stuffing table where it is gathered up after the completion of the stuffing and linking cycles. Thereafter, the linked strand is cooked and/or smoked. After cooking and/or smoking of the encased lengths of sausage, the individual links are separated and wrapped in plastic film packages for shipping.

In preparing intermediate diameter sausages such as chubs, an important consideration is the maintenance of uniform size control, primarily circumferential size, over the stuffed sausage being produced. It is very important that the diameter of the chub be carefully controlled, for if the diameter of the chub exceeds certain limits, the chub cannot be machine packaged as conventional packaging machines are constructed to accomodate only chubs having a limited diameter range. If the chub is oversized and will not fit in the automatic packaging machine, the sausage must be rejected for shipment. Further, if the chub is too dimensionally oversized or misshapen, the chub has an unusual, nonuniform appearance which will be rejected by the consumer.

In the manufacture of chubs, there has been encountered situations in which about 10% of the chubs, i.e., 10 out of 100 of a filled and linked strand of miscellaneous casing have had to be rejected for shipment because of their oversize dimensions.

SUMMARY OF THE INVENTION

In accordance with the practice of the present invention, there is provided a method whereby the size of meat stuffed cellulosic food casings is maintained at uniform dimensions whereby there is applied to the exterior walls of the cellulosic casing, prior to stuffing, a coating composition which will lower the coefficient of friction of the casing walls.

It has been determined that by lowering the coefficient of friction of the external wall of the casing, less oversize sausage links are produced when the casings are stuffed and linked.

It is believed that a major cause of oversized links is the fact that as the stuffed and linked sausages are fed to the stuffing table, friction between the external walls of the linked casings and the table surface retards the free movement of the links. As the links build up at a localized portion of the table, the build-up retards the delivery of the links to the stuffing table which in turn creates a back pressure on the linking machine. The creation of a back pressure causes excessive transverse stretching of the casing thereby resulting in oversized chubs.

If in accordance with the practice of the present invention, the external walls of the cellulosic casings are coated with a material which lowers the coefficient of friction of the external casing walls, greater sliding movement of the linked sausages on the stuffing table is effected which in turn causes a substantial reduction or elimination of a back pressure on the linking machine with the concomitant elimination of overstuffing of the casing.

PREFERRED EMBODIMENTS

The food casings to which the coating having a low coefficient of friction are applied are tubular casings formed of regenerated cellulose and fibrous reinforced regenerated cellulose.

Coating materials which impart a low coefficient of friction to cellulosic casing, which hereinafter will be referred to as antifriction adjuvants, include water soluble cellulose ethers. Water-soluble cellulosic ethers suited for practicing the invention include carboxymethyl cellulose, hydroxypropyl cellulose, methyl cellulose, ethylhydroxy ethyl cellulose, hydroxyethyl cellulose, carboxymethyl hydroxyethyl cellulose, and hydroxpropyl methyl cellulose. Quite often, the cellulose ethers are sold as the alkali metal salt and particularly the sodium salt. For purposes of this invention, references to a water-soluble cellulose ether is intended to encompass the alkali metal salts. In a preferred embodiment of the invention, the water-soluble cellulose ether is a low molecular weight carboxymethyl cellulose having from about 5–15 carboxymethyl groups per 10 anhydroglucose units.

Other materials which function as antifriction adjuvants when applied to the external walls of cellulosic casing include food grade mineral oil, silicone oils, edible vegetable oils, Aerosol-OT which is sodium dioctylsulfosuccinate and Polyox which is polyethylene oxide.

The antifriction adjuvant which is applied to the exterior surfaces of the cellulosic casing is applied as a dilute aqueous dispersion and the dispersion preferably contains from about 0.25 to 1.0% by weight of the adjuvant. This level of adjuvant in the aqueous dispersion when applied at appropriate levels on the casing yields about 0.25–1.0 mg. of the adjuvant per square inch of casing surface. In a preferred embodiment, the aqueous dispersion containing the antifriction adjuvant is applied to the exterior walls of the casing to produce from about 0.4–0.5 mg. of adjuvant per square inch of casing surface. Levels of adjuvant below about 0.01 mg. per square inch on the exterior of the casing surface often results in a casing having ordinary linking characteristics. When the level of antifriction adjuvant exceeds about 2.0 mg. per square inch of casing surface, then the surface of the casing often becomes slimy and is difficult to handle.

It has been observed in the practice of the present invention that some of the compositions used as antifriction adjuvants are sticky and adhesive in nature and can impart undesirable "pleat lock" characteristics to the shirred casing. By undesirable pleat lock, it is meant that the casing does not deshirr properly during the stuffing operation resulting in a high frequency of field breakage. Breakage due to pleat lock is presumably due to the undesirable adhesion of the nested pleats on the external portions of the antifriction coated casing. Therefore, it is advantageous that in addition to the antifriction adjuvant, there is incorporated in the aqueous dispersion applied to the external walls of the casing a second adjuvant which operates to prevent undesirable pleat lock in the shirred casings. It has been determined that if a water soluble alkylene oxide adduct of a partial fatty acid ester is incorporated in the aqueous dispersion containing the antifriction adjuvant, the externally coated shirred sausage casings have excellent pleat lock characteristics so that the casing can be used with high speed stuffing machines without undergoing abnormal breakage during deshirring.

Illustrative of water soluble alkylene oxide adducts of partial fatty acid esters useful as anti-pleat lock additives include ethoxylated fatty acid partial esters of such polyols as anhydrosorbitols, glycerol, polyglycerol, pentaerythirtol and glucosides. Typical water soluble adducts of this class are materials commercially available under the trademark "Tween" from Atlas Chemical Industries. The polyoxyethylene sorbitan ester of higher fatty acids (Tween 80) is preferred.

The alkylene oxide adducts of partial fatty acid esters are included in the coating composition in a proportion of from about 0.25 to about 1.0% by weight. Levels of the alkylene oxide adduct from 1.0% and preferably 0.8 to 1.0 mg. per inch square of casing surface are applied to the external casing walls when incorporated in the aqueous dispersions at the concentrations discussed above.

In preparing aqueous dispersions containing the antifriction additive, and especially the cellulose ethers, it is highly advantageous that the dispersion also contain between 5–30% by weight of a polyol having from 3–6 carbon atoms and at least 2 hydroxyl groups. Typical polyols that can be employed are glycerol, propylene glycol, triethylene glycol and sorbitol. The amount of polyol that may be used is in general dependent on the desired viscosity of the aqueous dispersion of antifriction adjuvant and also on the amount of water that may be tolerated by the cellulosic casings being treated. Preferably a polyol concentration of 10–15% by weight is incorporated in the aqueous dispersions containing the antifriction adjuvant.

The antifriction adjuvant may be applied to the external walls of the cellulosic casing in any convenient manner. Thus, the aqueous dispersion of the antifriction adjuvant may be applied to the cellulosic casing while it is still in the gel state immediately prior to drying. Alternatively, the aqueous dispersion of the antifriction adjuvant can be applied to the dried cellulosic casing immediately before it is shirred to a compacted length or the shirred casing can be soaked in the aqueous disperson of the antifriction adjuvant immediately before it is placed on the stuffing horn and filled with sausage emulsion.

The following examples are provided to illustrate preferred embodiments of the invention and are not intended to restrict the scope thereof. All percentages are expressed as weight percentages.

EXAMPLE 1

A length of miscellaneous casing, i.e., a casing formed of regenerated cellulose having a diameter of 50 mm and a wall thickness of 2.5 mils, was coated with an aqueous dispersion containing 0.5% carboxymethyl cellulose (CMC), 1.0% Tween 80 and 13% glycerol so that about 0.50 mg/in$^2$ CMC was applied to the external walls of the casing. The casing was allowed to equilibrate, i.e., dry at room temperature for 24 hours and then soaked in water for thirty minutes. The soaked casing was then subjected to a friction test.

In this test a sample 3"×18"×0.025" of the soaked coated casing was mounted on a table. A two square inch polished stainless steel block weighing 183.5 grams was attached to an Instron machine which pulled the block across the sample mounted on the table at a crosshead speed of 20 inches per minute. The force required to pull the sample was continuously recorded on a chart. The block was pulled until three inches were recorded on the chart. The coefficient of friction was determined as being the force (in grams) necessary maintain movement of the block divided by the weight of the block.

The procedure of Example 1 was repeated with the exception that the coated casing was rewet using a water spray instead of soaking it in water just prior to the friction tests being conducted.

For purposes of contrast, the procedure of Example 1 was repeated with the exception that no antifriction adjuvant was applied to the casing and the casing was rewet by spraying.

The coefficients of friction for these casings were recorded and are summarized in the Table I below. In the test results recorded below, the larger the number, the higher the friction. The test results in Table I are the average of 3 individual tests with the same casing sample.

TABLE I

| Test No. | Antifriction Adjuvant Applied to Casing | Rehumidification Method | Coefficient of Friction |
|---|---|---|---|
| 1 | CMC + Tween 80 | Soak | 0.541 |
| 2 | CMC + Tween 80 | Spray | 0.320 |
| 3 | None | Spray | 1.344 |

EXAMPLE 2

In a series of runs, transparent regenerated cellulose casings having a diameter of 50 mm and a thickness of 2.5 mils treated to have a reduced coefficient of friction were prepared by applying to the exterior surface of the casing an ajuvant which imparted antifriction properties to the casing.

In the first series of runs, (identified in Table II below as Run Nos. 1-2), the antifriction adjuvant was applied as a dilute aqueous dispersion to the exterior surface of the casing before the casing was shirred. In Run No. 1, the adjuvant was dispersed in an aqueous solution containing 13% glycerol. In Run No. 2, the casing before shirring was humidified with an aqueous solution containing 13% glycerol and double the standard mineral oil application was applied to the external walls of the casing during shirring.

In the second series of runs (identified in Table II as Run Nos. 3-5), the shirred casing was soaked in a dilute aqueous solution of the adjuvant before the casing was stuffed.

In a third series of runs (identified in Table II as Run Nos. 6-8) the casing during its manufacture was soaked in a dilute aqueous solution of the adjuvant while in the wet gel state immediately before the gel casing was inflated and dried.

Shirred strands containing 66 feet of the antifriction coated casings were placed on a stuffing horn and stuffed with meat emulsion and linked using a Handtmann stuffing machine to prepare a link of 100 chubs. The linked chubs were examined for size. An acceptable chub circumference dimension was 58 mm. If the circumference of a chub was in excess of 61 mm, the chub was considered oversized. The number of oversized chubs in each linked strand was recorded and are summarized in Table II below. Links of 100 chubs which had been processed in shirred regenerated cellulose casing which had been soaked in water prior to its placement on the stuffing horn following conventional practice generally contained more than 10 oversize chubs.

TABLE II

| | Adjuvant in Aqueous Dispersion | | | | | |
|---|---|---|---|---|---|---|
| Run No. | CMC (%) | Tween 80 (%) | Aerosol OT (PPM) | Excess Mineral Oil | Polyox | No. Oversize Chubs/ 100 Linked |
| 1 | 0.5 | 1 | — | — | — | 1-2 |
| 2 | — | — | — | Twice Standard Amount | — | 5-8 |
| 3 | — | — | 500 | — | — | 5-8 |
| 4 | — | — | 500 | — | 1.0 | 1-2 |
| 5 | 1.0 | — | — | — | — | 1-2 |
| 6 | 0.33 | — | — | — | — | 5-8 |
| 7 | 1.0 | — | — | — | — | 1-2 |
| 8 | — | — | 500 | — | — | 5-8 |

By reference to Table II, it is immediately apparent that by following the practice of the present invention, the number of oversize chubs is substantially reduced, particularly when CMC is used as the antifriction adjuvant.

What is claimed is:

1. A process for preparing linked meat filled sausage casings of regenerated cellulose having uniform dimensional characteristics which comprises applying to the external walls of the casing an aqueous dispersion containing a water soluble cellulose ether and 0.25 to 1.0% by weight of an alkylene oxide adduct of a partial fatty acid ester, said cellulose ether imparting a low coefficient of friction to the casing, the water soluble cellulose ether being present in the dispersion at a concentration of about 0.25 to 1.0% by weight and being applied to the external wall of the casing in a proportion 0.25 to 1.0 mg/in$^2$ of external casing surface, filling the casing with meat emulsion after the aqueous dispersion is applied thereto and then linking the meat filled casing.

2. A process for preparing linked meat filled sausage casings of regenerated cellulose having uniform dimensional characteristics which comprises applying to the external walls of the casing an aqueous dispersion containing a polyethylene oxide, said polyethylene oxide imparting a low coefficient of friction to the casing, the polyethylene oxide being present in the dispersion at a concentration of about 0.25 to 1.0% by weight and being applied to the external wall of the casing in a proportion 0.25 to 1.0 mg/in$^2$ of external casing surface, filling the casing with meat emulsion after the aqueous dispersion is applied thereto and then linking the meat filled casing.

* * * * *